United States Patent [19]

Misek

[11] 4,027,970
[45] June 7, 1977

[54] METHOD AND APPARATUS FOR PASSIVE OPTICAL FUSING AND DISTANCE MEASUREMENT

[75] Inventor: Victor A. Misek, Hudson, N.H.

[73] Assignee: Sanders Associates, Inc., Nashua, N.H.

[22] Filed: Oct. 28, 1975

[21] Appl. No.: 626,383

[52] U.S. Cl. .............................. 356/4; 102/70.2 P; 250/201; 250/237 R; 354/25
[51] Int. Cl.² ...................... G01C 3/08; G01J 1/20
[58] Field of Search ........... 102/70.2 P; 250/237 R, 250/201; 354/25; 356/4, 5

[56] References Cited

UNITED STATES PATENTS

| | | | |
|---|---|---|---|
| 3,455,243 | 7/1969 | Martin | 102/70.2 P |
| 3,742,239 | 6/1973 | Gale | 102/70.2 P |
| 3,776,639 | 12/1973 | Stauffer | 250/201 |
| 3,781,110 | 12/1973 | Leitz et al. | 356/4 |
| 3,856,401 | 12/1974 | Heitmann et al. | 356/28 |

*Primary Examiner*—S.C. Buczinski
*Attorney, Agent, or Firm*—Louis Etlinger; Robert K. Tendler

[57] ABSTRACT

Distance measurement is provided by an optical system which includes modulation detection apparatus for determining when the optics are a predetermined distance from an object. This is accomplished by detecting an in-focus condition in terms of the modulation content of a cross-correlated signal. When the device is used as a fuse, a fire control signal is initiated when the ordinance device carrying the fuse is at a predetermined distance from a target. The system includes a stationary cross-correlation grating set at an optimal single spatial frequency based on the resolution and more specifically the modulation transfer function of the optics used. The grating is located at the image plane of an optical imaging system and an optical wedge is mounted for rotation about optical axis of this system so that the image is circularly nutated in the plane of the cross-correlation grating. Light passing through the cross-correlation grating is directed to a detector whose output is then amplified, filtered and rectified to yield a signal proportional to the modulation content of the output signal from the detector, with 100 percent modulation indicating an in-focus condition. This signal is compared, in one embodiment, to the output of a second detector which establishes an adaptive threshold such that when this threshold is exceeded an alarm or fire control signal may be initiated. The threshold level corresponds to a modulation percentage indicative of an acceptable in-focus condition. The cross-correlation grating in a preferred embodiment takes on the form of a multi-apertured disc with the apertures arranged at the apices of a hexagonal pattern.

24 Claims, 5 Drawing Figures

METHOD AND APPARATUS FOR PASSIVE OPTICAL FUSING AND DISTANCE MEASUREMENT

This invention relates to passive optical fusing and distance measureing apparatus and more particularly to a system utilizing a single frequency cross-correlation to provide a system of uniquely sharp response to an in-focus condition.

BACKGROUND OF THE INVENTION

The problem of the detonation of a charge at a predetermine distance from a target has in the past involved radio frequency signal generation and detection, reticle type position indicating systems and various chopping techniques. Active systems, those which transmit energy and receive return energy, are not desireable because the energy radiated may be detected and a jamming technique may be utilized once the existence of an incoming ordinance device is recognized.

By way of background, systems which sense an in-focus condition have been disregarded as not being sensitive enough to provide accurate distance measurement without complicated parallax processing. This lack of satisfaction with the utilization of focus alone as the distance determining element is described in U.S. Pat. No. 3,348,050 issued to R. V. Bez on Oct. 17, 1967. In this patent it is said that "the major difficulty in determining range by this method (an in-focus indicating method utilizing a moveable chopper grid) arises because the degree of modulation changes very slowly as the chopper grid is moved in either direction from the focal plane, and therefore it is difficult to servo on the maximum point". In Bez's patent a chopper grid is rotated in front of a detector and the percentage of modulation is sensed, with an in-focus condition indicated by a maximum in the amplitude of the signal indicating modulation percent.

It is the recognition that this statement refers to relatively coarse grids where the grid lines occupy no more than 10 percent of the number permitted by the resolution of the lens which leads to the subject invention. In the prior art systems the patterns on the choppers do not represent a single spatial frequency across the entire extent of the chopper. Moreover, since the outer patterns on the chopper described in the Bez patent revolve faster than inner patterns there is no one temporal modulation frequency to which the systems described in the Bez patent are set. This results in a lack of resolution or sensitivity. On the other hand, the subject system to be described uses a stationary grid set to a single spatial frequency to achieve exceptional sensitivity. As will be described, the optimum frequency for this grid is related to the resolution of the optical system and is the frequency at which there is a maximum difference between the in-focus modulation transfer function (MTF) curve for the optical system utilized and the MTF curve associated with the maximum focus offset for a given system accuracy.

The modulation transfer function is perhaps the most accurate way of defining the resolution of an imaging system as it takes into account not only the ability of an imaging system to resolve adjacent lines at an object plane but also the intensity of the resolved lines. By setting the grating to a single frequency as described above, one maximizes the response of the system based on the difference in resolution at the in-focus condition and resolution at a predetermined out-of-focus condition related to range accuracy.

Once the frequency of the grating is set by appropriate patterning of the cross-correlation grating, very small defocusing errors result in very large signal differences and the difference between the in-focus, and out of focus condition is magnified. The subject system also uses a nutating scan to achieve a constant temporal modulation frequency everywhere within the field of view. This minimizes the required video bandwidth, allowing reduction of the electrical noise in the system.

For example, utilizing a diffraction limited optical system, one whose resolution is impaired only by the finite wavelength of light, and assuming that it is desirable to detonate a charge at, for instance, 10 meters ±0.01 meter from a target, in a given system this tolerance may correspond to a shift of the axial position of the image plane from the in-focus image plane (the image plane established by images at exactly 10 meters in this case) a distance of only ±3 wavelengths of the light detected by the system. Having determined that an accuracy of ±0.01 meters (corresponding to a 3 wavelength offset) is acceptable, the spatial frequency of the cross-correlation grating is set to correspond to that frequency at which the greatest difference exists between the 3 λ modulation transfer function (MTF) and the in-focus MTF. This can be accomplished by inspection of the particular MTF curves for a given optical system.

It will be appreciated that for diffraction limited optical systems the rate change of the amplitude of the output signal vs. spatial frequency is greatest at the higher spatial frequencies. By setting the spatial frequency of the cross-correlation grating at the point of maximum signal variation, the grating in effect chooses the high spatial frequency portion of the spectrum. As a result, objects having well defined edges such as aircraft, naval vessels, etc., are distinguished from their surroundings which may include clouds having diffuse edges or ocean waves having no easily discernable edges whatsoever.

It will be appreciated that systems in the prior art have spatial frequencies which are exceptionally broadband as they utilize rotating choppers or chopping discs having patterns which do not define a single spatial frequency. This was thought to be desirable in order to preclude jamming. However, it has been found that by the utilization of a single spatial frequency grating and that by appropriate setting of the spatial frequency, a sensitive narrow band system is achieved which minimizes the effectiveness of countermeasures. In the subject system the spatial frequency can be easily changed by changing the grating and different spatial frequency gratings can be easily inserted in different ordinances for countermeasure resistance. The subject system therefore not only discriminates against low spatial frequency objects but also acts as a very sharp filter for counter measure rejection.

In one embodiment the subject invention includes an optical imaging system with an optical wedge rotated about the optical axis of the system and with a cross-correlation grating fixedly mounted at the image plane of the optical system for an object at a desired distance. The grating in one embodiment includes a number of apertures arranged at the apices of a hexagonal pattern. This type grating provides a nearly constant temporal modulation (chopping) rate for the nutating image over the entire field of view, permitting use of a narrow band video amplifier for optimum noise and countermeasure rejection. A field lens is utilized in back of the cross-correlation grating to concentrate the light from the entire grating onto a single detector. The output of the detector is amplified and scan or temporal modulation frequency components are eliminated at a bandpass filter which is set at a frequency higher than the temporal modulation frequency. In this regard, in one embodiment, the passband filter is set to the spatial frequency of the grating times the image velocity (units of distance/sec.) where the units of distance are the same units of distance as those used in defining the spatial frequency. The output of the filter is thus a signal representing the degree of modulation of the light from the grating. The output from the bandpass filter is rectified to provide a DC signal whose level is proportional to the amount of modulation of the light through the grating. An adaptive threshold is set in one embodiment such that when the level of the DC signal exceeds the threshold indicative of maximum modulation, an in-focus condition is sensed and a charge is detonated.

What has therefore been provided is an exceptionally simple and extremely accurate range determining system which may be utilized on a large variety of projectiles or missiles or other optical systems, such as cameras. In the case of spinning projectiles or missiles it is preferrable to despin the fuze to keep the image from rotating on the grating in order to minimize video bandwidth. On missiles and projectiles which are not spin stabilized, rotation of the wedge is easily accomplished.

By utilizing diffraction limited optics and by careful choice of the spatial frequency of the cross-correlation grating, practical accuracies of ±1 meter for ranges of 100 meters can be achieved. In the theoretical limit, with perfect defraction limited optics, this error can be cut to ±1 centimeter in the best case. Thus while rotating chopper and modulation detection systems have been proposed in the past, by use of a fixed grating, a nutating image and proper selection of the single spatial frequency for the grating, at least an order of magnitude improvement in resolution is now achieveable.

It is therefore an object of this invention to provide an improved range determining method and apparatus.

It is another object of this invention to provide an improved passive optical fusing mechanism utilizing a nutating image movement or circular scan and a cross-correlation grating which not only provides for selection of a single spatial frequency but also selects the spatial frequency on the basis of the maximum MTF curve variation at the desired range accuracy.

It is a further object of this invention to provide for the nutation of an image at the image plane of an optical system at which a cross-correlation grating is located.

It is a further object of this invention to provide an improved cross-correlation grating for passive optical range finding equipment or cameras.

These and other objects of this invention will be better understood in connection with the following description in view of the appended drawings in which:

DETAILED DESCRIPTION

Figure 1:
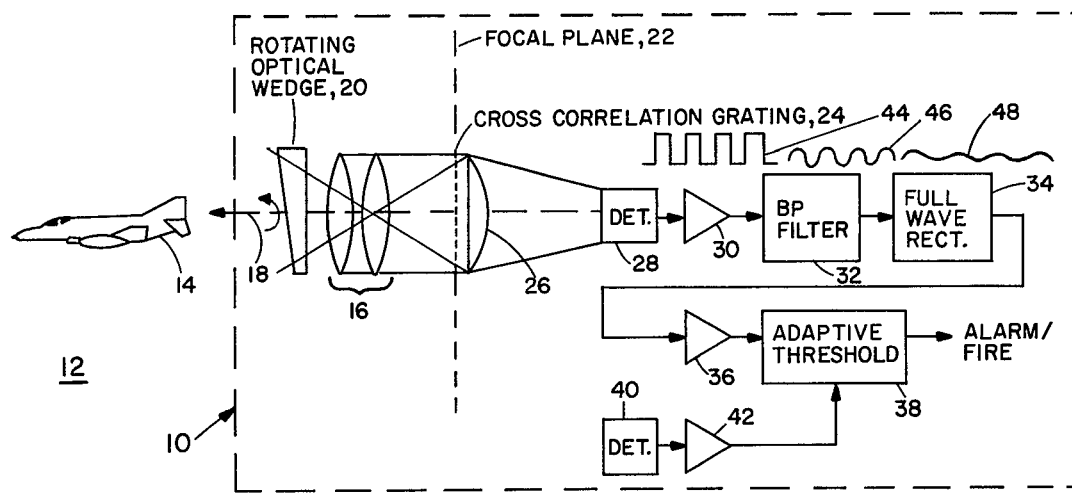
FIG. 1 is a block diagram of the subject system illustrating the location of a cross-correlation grating at the focal plane of an optical telescope which utilizes a rotating optical wedge in front of the optical elements.

Referring now to FIG. 1 an optical fire control system 10 may be located aboard a missile, projectile, bomb, etc. This system is passive in the sense that it obtains information from a scene 12 and determines when an object 14 in the scene is in focus. This focal distance may be preset such that when the projectile is within a given range a fire control signal is initiated to detonate an explosive charge (not shown). The system to be described is most useful against objects silhouetted against the sky such as aircraft, missiles, etc. or objects on the surface of the ocean. The subject system can also be utilized in aerial dropped charges, bombs, etc. in which the bomb is to detonate at a predetermined height above the surrounding terrain. It will be appreciated that while RF fuses key off the ground the subject fuse will key off camouflage, which may be of advantage in certain tactical situations.

The subject fuse includes a lens system diagrammatically illustrated at 16 which has an optical axis 18 about which an optical wedge 20 is rotated. If the missile or projectile is spin stabilized then it is preferred that the image be despun in order to preserve the nutational scan motion. Otherwise any conventional assembly may be utilized to rotate the optical wedge.

Optics 16 define an image plane 22 for objects at a predetermined distance and a cross-correlation grating 24 to be described hereinafter is located at this image plane. An energy transfer lens 26 is located behind the cross-correlation grating to focus the entrance pupil of optics 16 onto a conventional detector 28. Detector 28 is coupled through an amplifier 30 to a bandpass filter 32 set to filter out frequencies corresponding to the rotational frequency of the wedge. The bandpass frequency is in general set to the spatial frequency times the image velocity as described hereinbefore. The output of the bandpass filter is full wave rectified by rectifier 34 which may contain smoothing circuits, is amplified by an amplifier 36, and is coupled to a conventional adaptive threshold device 38 which puts out or initiates an alarm or fire control signal when the level of the signal at the input thereto exceeds a predetermined threshold. The adaptive threshold is set to follow the ambient light from the scene. For this purpose a detector 40 is provided which produces a signal coupled through an amplifier 42 to the adaptive threshold unit. Adaptive thresholding is well known in the art and performs the function of setting a threshold with respect to a given condition. In this case the given condition is the ambient light from the scene.

In operation, object 14 from scene 12 is imaged onto the cross-correlation grating. With the rotation of the optical wedge, the image is circularly nutated or rotated at a frequency commensurate with the rotational speed of the rotating wedge. Since the image is made to sweep by a number of apertures in the cross-correlation grating, the output from detector 28 will be a series of pulses 44 when the object is perfectly in focus. These pulses degrade to a sinusoidal waveform 46 having an average amplitude less than the average amplitude of the pulses as the object goes out of focus. The amplitude of this waveform decreases as illustrated at 48 until such time as there is no apparent modulation on the signal from detector 28. This occurs when the particular object is sufficiently far out of focus. The band-pass filter eliminates the sinusoidal or periodic component of the signal from the detector and therefore acts as an envelope detector such that the output of a band-pass filter is a modulation waveform. When full wave rectified, this signal becomes a DC signal whose amplitude represents the degree of modulation and hence the degree of focus of the object with respect to the optical system. As the missile, projectile, or bomb, etc. approaches its target, the target will become in-focus at a predetermined range. At this point the modulation of the signal at the output of the detector is maximum and this occurrence is sensed, in one embodiment, by the aforementioned adaptive threshold.

As mentioned hereinbefore what makes the subject system so sensitive to the in-focus condition is the particular method of scanning of the image and the particular type of cross-correlation grating utilized.

Figure 2:
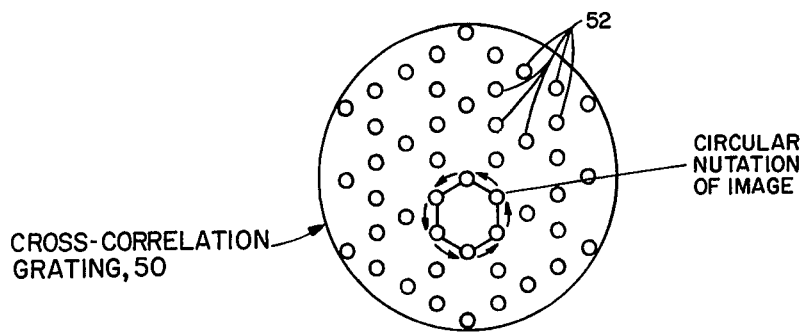
FIG. 2 is a diagrammatic illustration of a portion of the cross-correlation grating illustrating a hexagonal aperture structure and the nutation of an image across the grating.

Referring to FIG. 2 a section 50 of the cross-correlation grating 24 of FIG. 1 is illustrated as having apertures or transparent regions 52 which are arranged, in one embodiment, at the apices of a hexagonal pattern. The spacing or size of the hexagonal pattern determines the single spatial frequency of the system. As illustrated by the arrows of FIG. 2 the image is made to rotate or nutate in a circular fashion such that a point on the image revolves in a circle at the image plane and thus at the cross-correlation grating. The frequency of the grating is equal to the number of holes per millimeter of circumference of the circle cut by the rotation or nutation of the image. It will be appreciated that the large number of holes or apertures per millimeter of circumference the greater will be spatial frequency of the grating. It is this frequency which is to be set to maximize the response of the system to the in-focus condition.

As will be seen it is not necessarily the quality of the optics which provides for the relatively sharp response of the system but rather the matching of this spatial frequency to a particular MTF quality of the optics, regardless of the optical system used. This quality is determined as will be discussed in connection with FIG. 4 by the modulation transfer function of the optics.

Figure 3:
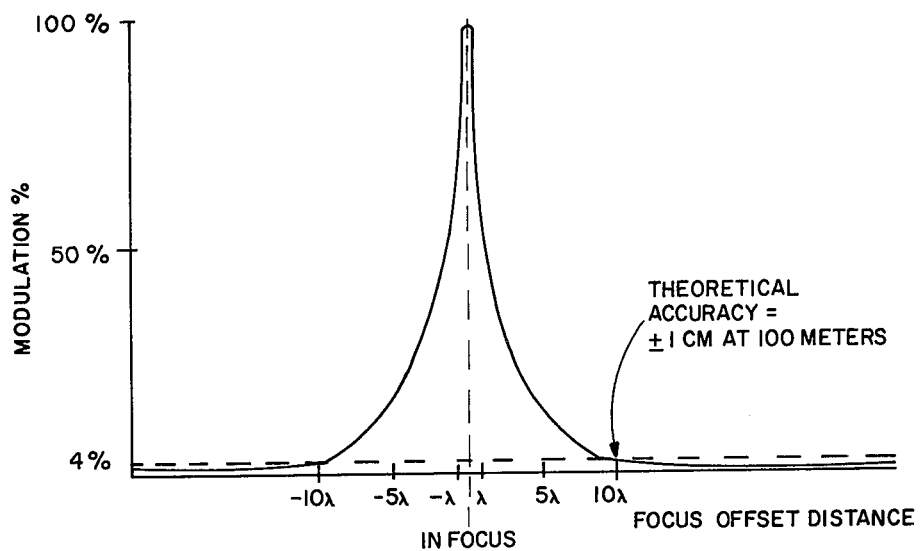
FIG. 3 is a graph of percent modulation of the signal from the detector of FIG. 1 vs. focus offset in terms of wavelengths of light from the image.

However, to put the invention in perspective and referring now to the graph of FIG. 3 it will be seen that the subject system has a very sharp response to the in-focus condition. In this figure focus offset distance is graphed against percent modulation of the signal from detector 28 of FIG. 1. Throughout the remainder of this specification the focus offset distance will be measured in terms of wavelengths of the light impinging upon the system. Thus, for instance, when the optical system is slightly out of range the image may exist at a distance removed from the in-focus image plane by some multiple of wavelengths. As an example, at a given relative position between the object and the optical system the image may be said to be infocus if it exists at ±1 wavelength from the in-focus image plane of the optical system. Projected back out through the optical system, depending on the optical system utilized, a focus offset distance of 1$\lambda$ may be equivalent to a range error of about ±0.1 centimeters. Note: At 100 meters with 50mm focal length $f/2$ diffraction limited lens, $\lambda = 5000$A, one $\lambda$ of defocusing equals 1 millimeter at 10 meters. A focus offset distance of 10$\lambda$ may therefore be equivalent to a range error of ±1 centimeter. Assuming that the subject system detects a range of 100 meters, as the projectile comes closer to the object, the modulation percentage increases. When the projectile is within 100.01 meters of the image this will correspond, at least theoretically, to a focus offset distance of $-10\lambda$. As can be seen from the graph this condition will result in a 4 percent modulation. As the projectile comes closer to the object the modulation percentage increases very quickly such that when the projectile is within 100.001 meters the modulation will have jumped from 4 to 80 percent. The in-focus condition therefore of the subject system is extremely narrow or sharp, unlike that predicted in the prior art. The reason for the relatively sharp response characteristic of the subject system arises from the single spatial frequency of the cross-correlation grating, and the setting of this frequency at a particular point. The location of this particular spatial frequency is now described in connection with FIG. 4.

Figure 4:
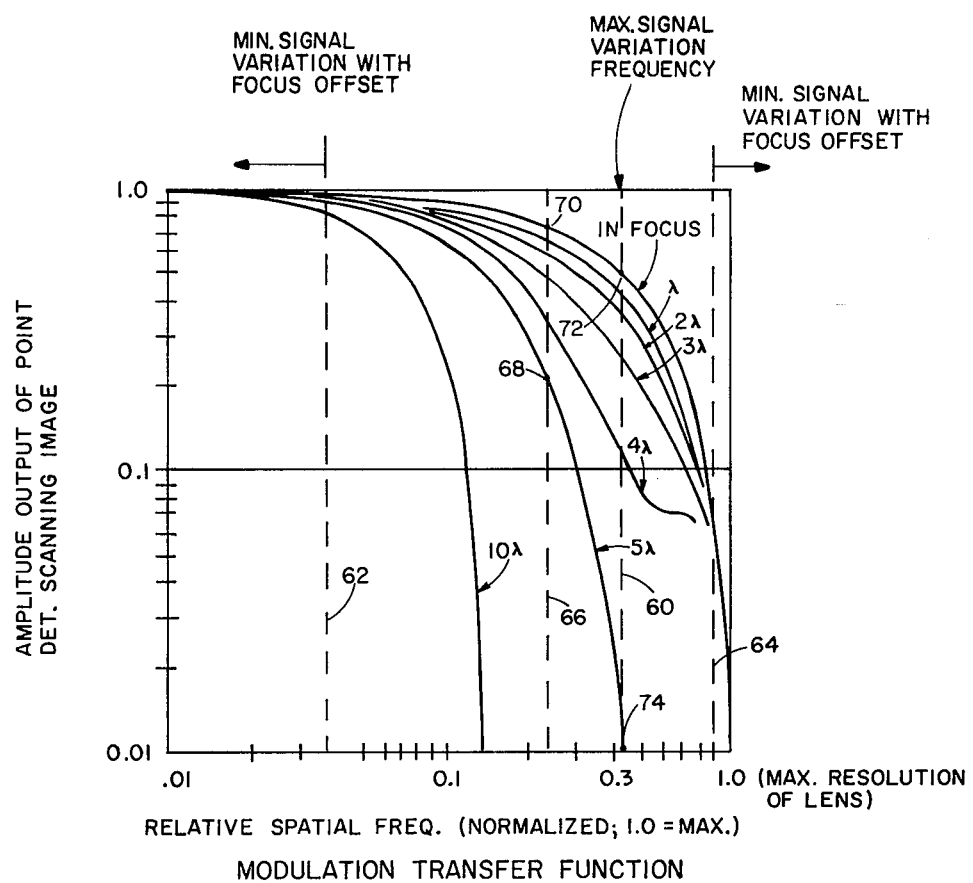
FIG. 4 is a graph of a modulation transfer function of a typical diffraction limited optical system indicating the setting of the spatial frequency of the cross-correlation grating at a point of maximum signal variation for a given range, in which the accuracy is determined by the $n\lambda$ MTF curve corresponding to a given range accuracy.

Referring now to FIG. 4 a modulation transfer function of a typical diffraction limited lens system is illustrated in which relative spatial frequency is graphed against the amplitude of the output of a point detector which scanning across the image. The right end of the x-axis, 1.0, corresponds to the maximum number of line/mm resolvable by the lens. As can be seen the in-focus modulation transfer function procedes almost horizontally at relatively low spatial frequencies and then reacts rather strongly at the higher relative spatial frequency. This is true of not only the in-focus modulation transfer function but also the modulation transfer functions for the $\lambda$, $2\lambda$, $3\lambda$, $4\lambda$, $5\lambda$, $10\lambda$ offset focus lines.

The spatial frequency of the cross-correlation filter is set as follows. First, a given accuracy for the system is specified in terms of range. For instance, let the accuracy be ±10 centimeters. For a given optical system this may correspond to a focus offset of ±5$\lambda$. The spatial frequency of the cross-correlation grating is then set such that there will be a maximum MTF variation between the 5$\lambda$ condition and the in-focus condition. In the case of FIG. 4 this frequency is indicated by dotted line 60. The maximum variation is arrived at by subtracting the amplitudes of various MTF curves at different spatial frequencies. The MTF curves selected are the curves indicating the in-focus condition and the particular offset curve giving the desired system accuracy.

It will be appreciated that the frequency to which the cross-correlation grating is to be set lies somewhere between the low frequency end as illustrated by dotted line 62 and the high frequency end illustrated by dotted line 64. At both lines there is minimum MTF curve difference for a given frequency. For any given optical system the manufacturer specifies the modulation transfer function graph. It is a relatively simple matter, having decided upon a given system accuracy, to calculate the focus offset for this range accuracy and thence to determine the spatial frequency which gives the maximum MTF variation between the MTF curve corresponding to this offset and the in-focus MTF. In the previous example for instance, if one were to choose a frequency represented by dotted line 66 one would see that the MTF curve variation as indicated by the distance between points 68 and 70 would be shorter than the distance between points 72 and 74. Thus, one would reject designing the cross-correlation grating at the frequency represented by dotted line 66. Another way of specifying the preferred spatial frequency for some special cases is to define it as the frequency at which the MTF curve has a minimum amplitude for a given maximum offset. This system may be used where range offset focus error may be large, such as a 5λ offset (the case illustrated by the graph of FIG. 4).

Figure 5:
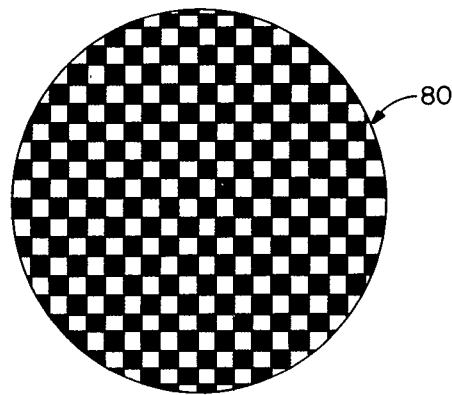
FIG. 5 is a diagram of a different type of cross-correlation filter useable with the subject system.

It will be appreciated that the apertured disc illustrated in FIG. 2, while it gives extremely satisfactory results, may be replaced by any of a number of cross-correlation gratings. One such grating is illustrated in FIG. 5 by reference character 80. In this grating a checkerboard of opaque and transparent regions make up the cross-correlation grating. The spatial frequency of this grating is determined in the same way as that of FIG. 2 in that it is the number of transparent portions per millimeter cut by the nutated image.

It will be appreciated that for perfect cross-correlation the apertures in a grating may be shaded to correspond to sinusoidal variations in optical density. However, higly defined apertures yield sufficient sensitivity for most purposes.

The subject system is adapted not only to any system which requires distance measurement but may also be used to adjust focus for objects at unknown distances from an imaging system. Thus information developed by by subject apparatus can be used in a closed loop system to adjust the focus of a camera by detecting modulation percent and by adjusting the distance between the lens system and a predetermined receptor in accordance with the percent modulation. In other applications, the subject system may be used in collision avoidance systems which actuate an alarm for objects which come into focus at a predetermined distance considered indicative of a possible collision. Moreover this system can be used with any type imaging system, whether lenses are used or not. Thus this system thus finds application in holographic type imaging systems and other imaging systems in which lenses are not used.

Although a specific embodiment to the invention has been described in considerable detail for illustrative purposes, many modifications will occur to those skilled in the art. It is therefore desired that the protection afforded by Letters Patent be limited only by the true scope of the appended claims.

What is claimed is:

1. A method for detecting when an object is at a predetermined distance from an optical system having predetermined modulation transfer functions at predetermined in-focus and out-of-focus image planes comprising:
locating a member having opaque and transparent regions at the image plane of the optical system established by objects at said predetermined distance, with the transparent regions of the member defining a single spatial frequency equal to that at which the difference in amplitude between the in-focus modulation transfer function and the modulation transfer function corresponding to said out-of-focus image plane is substantially maximum,
moving the image of the object across the member in a cyclic manner; and
detecting percent modulation of the light which has passed through the member whereby a maximum modulation percentage indicates an in-focus condition when said object is at said predetermined distance.

2. The method of claim 1 wherein said member is maintained stationary with respect to rotation about the optical axis of said optical system.

3. Apparatus for detecting when an object is at a predetermined range from an optical system comprising:
an imaging system having an optical axis, an in-focus modulation transfer function and a modulation transfer function corresponding to the image plane offset for a predetermined range accuracy,
a grating having transparent regions defining a single spatial frequency equal to that at which the difference in amplitude between the in-focus modulation transfer function of said imaging system and the modulation transfer function representing the image plane offset for a predetermined range accuracy is substantially maximum;
means for locating said grating at the image plane of said imaging system established by objects at a predetermined range;
means for moving the image of the object across the grating in a cyclic manner; and
means for detecting percent modulation of the light which has passed through the grating.

4. The apparatus of claim 3 wherein said spatial frequency is that frequency at which the modulation transfer function representing the maximum focus offset for a predetermined range accuracy has a minimum amplitude.

5. The apparatus of claim 3 wherein said grating is maintained stationary with respect to rotation about said optical axis.

6. The apparatus of claim 3 wherein said providing means includes an optical wedge rotated about said optical axis.

7. The apparatus of claim 6 wherein said optical wedge is located ahead of said imaging system.

8. The apparatus of claim 3 wherein said detecting means includes a detector, means for focusing light which has passed through said grating onto said detector, means for detecting the modulation envelope of the signal from said detector and means for full-wave rectifying the output from said modulation envelope detector.

9. The apparatus of claim 8 and further including adaptive threshold means responsive to the amplitude of the output of said full-wave rectifying means for producing a signal whenever said full-wave rectifying means output exceeds a predetermined level indicating a predetermined percent modulation.

10. The apparatus of claim 3 wherein said grating includes an opaque body having transparent regions arranged at the apices of a hexagonal pattern.

11. The apparatus of claim 3 wherein said grating includes a body having a checkerboard arrangement of transparent and opaque regions.

12. A passive optical fuse for detonating a charge carried by an ordinance device, when said device is at a predetermined distance from an object comprising:
- an imaging system having an in-focus modulation transfer function and a modulation transfer function corresponding to the image plane offset for a predetermined range accuracy;
- a grating having transparent regions definning a single spatial frequency equal to that at which the difference in amplitude between the in-focus modulation transfer function of said imaging system and the modulation transfer function of said imaging system representing the image plane offset for a predetermined range accuracy is substantially maximum;
- means for locating said stationary grating at the image plane of said imaging system for a predetermined range;
- means for moving the image of the object across the grating in a cyclic manner;
- means for detecting percent modulation of the light which has passed through the grating; and
- means responsive to the percent modulation reaching a predetermined percent for detonating said charge.

13. Apparatus for detecting when an object is in focus at a predetermined location with respect to an optical system having a predetermined in-focus modulation transfer function and a modulation transfer function corresponding to the image plane offset for a predetermined range accuracy comprising:
- a grating at said predetermined location having transparent regions defining a single spatial frequency equal to that at which the difference in amplitude between the in-focus modulation transfer function and the modulation transfer function representing the image plane offset for a predetermined accuracy is substantially maximum;
- means for moving the image of the object formed by said optical system across said grating in a cyclic manner; and
- means for detecting the level of a signal formed from the light which has passed through the grating, whereby a maximum in said level indicates an in-focus condition at said location.

14. Apparatus for detecting when an object is in focus at a predetermined location with respect to an optical system having a predetermined in-focus modulation transfer function and a modulation transfer function representing the image plane offset for a predetermined accuracy comprising:
- a grating at said location with spaced apertures patterned so as to represent a single spatial frequency equal to that at which the difference in amplitude between the in-focus modulation transfer function and the modulation transfer function representing the image plane offset for a predetermined accuracy is substantially maximum;
- means for causing the image formed by said optical system to cyclically pass by a fixed number of apertures per cycle; and
- means for detecting percent modulation of the light which has passed through the grating, whereby a maximum modulation percentage indicates an in-focus condition at said location.

15. The apparatus of claim 14 wherein said grating is maintained stationary with respect to rotation about the optical axis of said optical system.

16. Apparatus for detecting when an object is in focus at a predetermined location with respect to an optical system comprising:
- a grating at said location, said grating having spaced apertures patterned so as to represent a single spatial frequency in the direction of a cyclically moving image thereon and set to maximize the response of said apparatus;
- means for causing the image formed by said optical system to cyclically pass by a fixed number of said apertures per cycle; and
- means for detecting percent modulation of the light which has passed through the grating, whereby a maximum modulation percentage indicates an in-focus condition at said location.

17. A method for improving the detection of the distance of an object from an optical system comprising:
- locating a member having transparent and opaque regions on the image side of the optical system, with the transparent regions of said member defining a single spatial frequency in the direction of a moving image thereon, said spatial frequency being based on the in-focus resolution of the optical system and the resolution of the optical system for a predetermined out-of-focus condition;
- moving the image of the object across said member so as to cut the transparent regions of said member in a cycle manner; and
- detecting the level of a signal derived from the light which has passed through said member, whereby a maximum in the level of said signal indicates an in-focus condition and thus a predetermined distance of the object from the optical system.

18. The method of claim 17 wherein said resolution is measured by the modulation transfer function of the optical system.

19. The method of claim 17 wherein said member is stationary with respect to rotation about the optical axis of said optical system.

20. Apparatus for detecting the distance of an object from an optical system comprising:
- a member having transparent and opaque regions, with the transparent regions of said member defining a single spatial frequency in the direction of the movement of an image thereon, said spatial frequency being based on the in-focus resolution of the optical system and the resolution of the optical system for a predetermined out-of-focus condition;
- means for locating said member at a location on the image side of said optical system;
- means for moving the image of said object across said member; and
- means for detecting the amount of modulation of the light which has passed through said member, whereby a maximum in the amount of modulation indicates an in-focus condition and thus a predetermined distance of an object from the optical system.

21. The apparatus of claim 20 wherein said resolution is measured by the modulation transfer function of the optical system.

22. The apparatus of claim 20 and further including means for maintaining said member stationary with respect to rotation about the optical axis of said optical system.

23. In an optical system having means for detecting when an object is in-focus and thus at a predetermined distance from the focusing means thereof, in which said system includes a grating and means for moving the image of the object produced by the focusing means across the grating in a cyclic manner, the focusing means having a modulation transfer function for an image plane established by an in-focus object, and a modulation transfer function for an image plane which is offset from the in-focus image plane by an amount corresponding to a predetermined difference in location between an in-focus object and an out-of-focus object, a method for optimizing the response of said system, comprising the steps of:

providing a grating having opaque and transparent regions defining a single spatial frequency, the spacing of said transparent regions being such that the spatial frequency of said grating is equal to that at which the difference in amplitude between said in-focus modulation transfer function and said offset modulation transfer function is substantially maximum, whereby said grating is matched to the resolution of said optical system, and locating said grating at said in-focus image plane.

24. A method of optimizing the performance of a focus detection system utilizing a grating, focusing means, and means for causing the image produced by said focusing means to cyclically traverse the grating comprising:

providing a gratng with apertures defining a single spatial frequency in the direction of the cyclical traverse of the image and, matching the single spatial frequency to the resolution of the focusing means in terms of in-focus and out-of-focus MTF characteristics for the focusing means.

* * * * *